(12) United States Patent
Umezawa et al.

(10) Patent No.: US 7,386,722 B2
(45) Date of Patent: Jun. 10, 2008

(54) CERTIFICATE MANAGEMENT SYSTEM AND METHOD

(75) Inventors: Katsuyuki Umezawa, Machida (JP);
Hiroki Uchiyama, Yokohama (JP);
Seiichi Susaki, Yokohama (JP);
Toshiomi Kodama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 732 days.

(21) Appl. No.: 10/766,869

(22) Filed: Jan. 30, 2004

(65) Prior Publication Data

US 2005/0120205 A1     Jun. 2, 2005

(30) Foreign Application Priority Data

Dec. 2, 2003   (JP)   ............................... 2003-402401

(51) Int. Cl.
*H04L 9/00*   (2006.01)
(52) U.S. Cl. ...................... 713/156; 713/155; 713/168; 713/175; 380/277
(58) Field of Classification Search ................ 713/155, 713/156
See application file for complete search history.

(56) References Cited

U.S. PATENT DOCUMENTS 6,438,550 B1 *   8/2002   Doyle et al. .................... 707/9
2002/0026578 A1 *   2/2002   Hamann et al. ............. 713/159
2003/0056099 A1   3/2003   Asanoma et al.
2003/0163687 A1 *   8/2003   Dare et al. .................. 713/157

FOREIGN PATENT DOCUMENTS

JP   2002-298088   10/2002

OTHER PUBLICATIONS

"Global Platform Card Specification Version 2.1" p. 27, Global Platform Inc. of U.S.A., Jun. 2001.

* cited by examiner

*Primary Examiner*—Kim Vu
*Assistant Examiner*—Yogeshi Paliwal
(74) *Attorney, Agent, or Firm*—McDermott Will & Emery LLP

(57) ABSTRACT

A certificate management method is provided whereby a plurality of service providers have different reliable certificate authorities and, when certificates issued from the certificate authorities are implemented into a smart card, merely by revoking the certificate issued from the certificate authority on which the first service provider relies, all other implemented certificates can be revoked, and the certificates can be individually revoked. A system for implementing the method is provided. The certificate authorities n ($n \geq 2$) issue a certificate n by using a private key n' corresponding to certificate n' generated by using a certificate 1 issued from a certificate authority 1 which has previously been installed in the smart card and a corresponding private key 1. Thus, the issued certificates have a hierarchical chain relation. When the user wants to revoke all certificates, the certificate 1 issued from the certificate authority 1 is revoked.

10 Claims, 6 Drawing Sheets

CERTIFICATE MANAGEMENT SYSTEM AND METHOD

BACKGROUND OF THE INVENTION

The invention relates to a certificate management system using a storing medium such as a smart card or the like and a method for such a certificate management system and, more particularly, to certificate management system and method for improving efficiency of a certificate revocation in the case where a plurality of certificates are implemented into a storing medium such as a smart card or the like.

A technique for implementing applications and data into a smart card by separating a storing area every service provider has been known. For example, refer to "Global Platform Card Specification Version 2.1", page 27, Global Platform Inc. of U.S.A., June, 2001.

There is also a technique which provides a scheme such that the user of a smart card applies for a public key certificate and obtains it, the obtained public key certificate is implemented into the smart card, and the public key certificate is actually issued. For example, refer to JP-A-2002-298088.

There is also a technique which provides a scheme for allowing a public key and a public key certificate implemented in a smart card to be safely rewritten from a remote position. For example, refer to U.S. patent application Publication No. 2003/0056099A1.

SUMMARY OF THE INVENTION

When services are provided, a service provider requests the service user to present a certificate issued from a certificate authority on which the service provider relies and can authenticate the service user by verifying whether the certificate has certainly been issued from the reliable certificate authority or not, whether a term of validity has expired or not, and the like.

There is considered a case where a plurality of service providers individually implement certificates and private keys corresponding to the certificates into a smart card which has been widespread in recent years and in which multiapplications can be implemented and execute an authenticating process.

There is also considered a case where the service providers want to rely on the certificate authority individually instead of relying on only one common certificate authority. In such a case, for example, if the owner of a smart card wants to revoke all certificates implemented in the smart card because he lost the smart card, he has to inform all of the service providers or certificate authorities, so that the efficiency is low. There is also a case where each service provider wants to revoke by his own power the certificate issued from the certificate authority on which he relies.

Therefore, a simple and flexible revoking method is demanded.

The invention is made in consideration of the above circumstances and provides a certificate management method whereby by generating one service provider (for example, a first service provider such as a card issuer or the like) and merely revoking a certificate issued from a certificate authority on which the first service provider relies, a certificate issued from a certificate authority on which another service provider relies can be also revoked and to provide a system to which such a method is applied.

The invention provides a certificate management method whereby in the case where certificates issued from different reliable certificate authorities have been implemented in smart cards and a plurality of service providers want to revoke certain specific certificates for some reason, the specific certificates can be individually revoked without revoking other certificates and to provide a system to which such a method is applied.

Specifically, there is constructed a hierarchical chain of certificates such that a certificate 2' of a second certificate authority on which a second lower service provider relies is generated in a smart card by using a first certificate 1 in the smart card issued by a first certificate authority on which a first upper service provider relies and, further, the second certificate authority forms a second certificate 2 by using the certificate 2'.

At this time, it is also possible to construct in a manner such that there are a plurality of second service providers, they rely on second different certificate authorities, and a plurality of second certificate authorities form second certificates, respectively.

By the above chain structure, in order to verify the validity of the lower certificate 2, verification of the validity of the certificate 2' and the certificate 1 is necessary. That is, if the user wants to revoke the certificate 1 and the certificate 2 for a reason such that the smart card was lost or the like, merely by revoking the upper certificate 1 issued by the certificate authority on which the service provider 1 relies, one or more lower certificates 2 issued by one or more certificate authorities 2 on which one or more service providers 2 rely can be revoked.

On the other hand, in the above chain structure, when each certificate is verified, revocation information issued by the certificate authority on the issuing source side is referred to, so that each certificate can be also revoked. For example, in the case where the service provider 2 stops the providing of services or the like, the revocation information by the certificate authority on which the service provider 2 relies is issued. Thus, while the certificate 1 issued by the certificate authority 1 on which the service provider 1 relies is held in a valid state, the certificate 2 issued from the certificate authority on which the service provider 2 relies can be revoked.

More specifically, a certificate management system according to the invention comprises: a service provider for verifying the validity of a presented public key certificate and, if the verification can correctly be made, providing services; a certificate authority on which the service provider relies; and a smart card.

According to another aspect of the invention, the smart card includes: a storing unit for storing a first private key and a first public key making a pair together therewith which are necessary to issue a certificate to the certificate authority, a first certificate issued for the first public key, a second private key and a second public key making a pair together therewith which are generated to receive the services from the service provider, and a second certificate which is issued for the second public key by the certificate authority on which the service provider relies; and a key generating unit for generating the first and second public keys and the first and second private keys.

According to still another aspect of the invention, the certificate authority includes: a storing unit for storing a third private key for generating the certificate of the second public key for the smart card and the certificate which is issued to a third public key making a pair together with the third private key; and a certificate generating unit for generating the second certificate for the second public key on the basis of an issuing request.

According to further another aspect of the invention, the smart card includes a certificate generating unit for issuing the certificate of the certificate authority by using the stored first private key on the basis of an issuing request for the certificate from the certificate authority.

According to further another aspect of the invention, in the certificate management system, the certificate authority comprises: a revocation information generating unit for generating revocation information of the certificate on the basis of a revoking request for the certificate; and a revocation information DB for storing the revocation information generated by the revocation information generating unit, the smart card presents the first and second certificates to the service provider in order to receive the services from the service provider, and the service provider includes a certificate verifying unit for inquiring of the certificate authority about the revocation information of the first and second certificates when the validity of the presented first and second certificates is verified.

According to further another aspect of the invention, in the certificate management system, at the time of the verification of the certificates, when the certificate authority verifies the second certificate, the service provider transmits a challenge, the smart card encrypts the challenge by the second private key and transmits the encrypted challenge, the second certificate corresponding to the second private key, and the first certificate corresponding to the first private key to the service provider, the service provider includes: a certificate verifying unit for decrypting the encrypted challenge, confirming whether the decrypted challenge coincides with the challenge transmitted to the smart card, obtaining the revocation information of the received first and second certificates, and executing the verifying process of the first and second certificates by using the obtained revocation information; and a service providing unit for providing the services if it is determined by the verifying process that the first and second certificates are valid.

According to the invention, in the case where a plurality of service providers implement the certificates which are issued from the different reliable certificate authorities into the system, the certificate management method having the simple and flexible revoking method can be provided.

Other objects, features and advantages of the invention will become apparent from the following description of the embodiments of the invention taken in conjunction with the accompanying drawings.

DETAILED DESCRIPTION OF THE EMBODIMENTS

An embodiment of the invention will be described. The invention is not limited by it.

Figure 1:
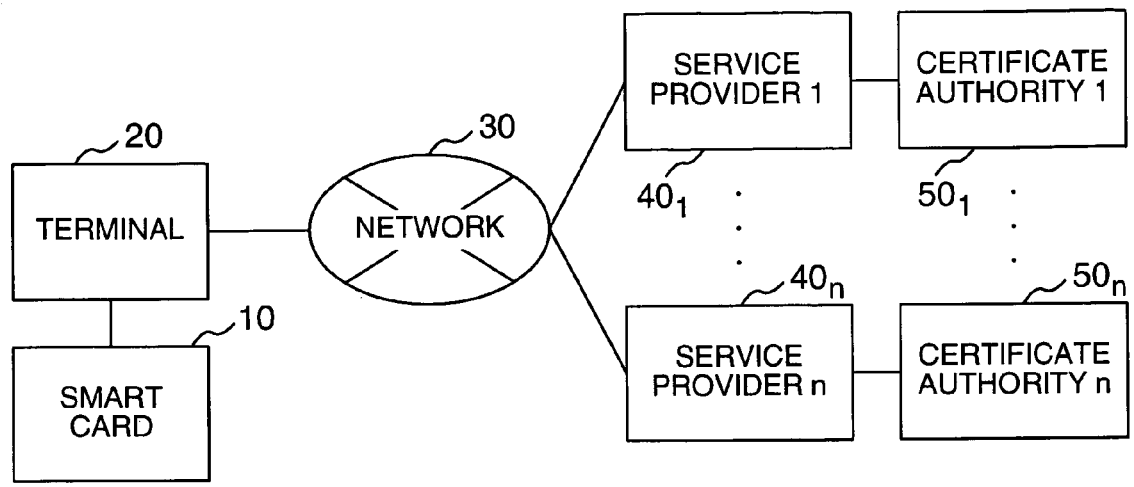
FIG. 1 is a diagram for explaining a network construction of a certificate management system showing an embodiment of the invention.

FIG. 1 is a diagram showing a network construction of a certificate management system showing an embodiment of the invention.

As shown in FIG. 1, the certificate management system of the embodiment is constructed by mutually connecting a plurality of service providers $40_1$ to $40_n$ (hereinafter, also simply referred to as a service provider 40) and a client terminal 20 (hereinafter, also simply referred to as a terminal 20) via a communication network 30 such as an Internet or the like. The terminal 20 is connected to a smart card 10.

The service providers $40_1$ to $40_n$ are connected to certificate authorities $50_1$ to $50_n$ (hereinafter, also simply referred to as a certificate authority 50), respectively.

Figure 2:
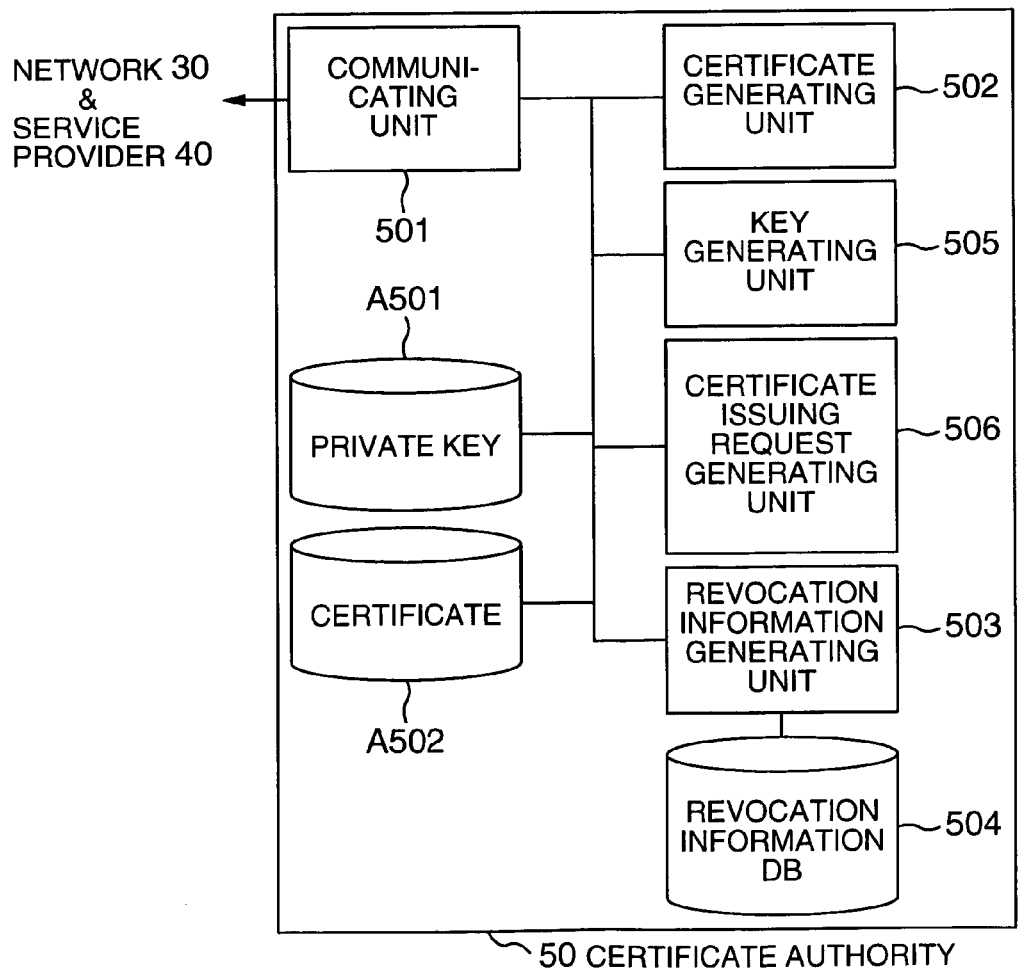
FIG. 2 is a diagram showing an example of a construction of a certificate authority.

The certificate authority 50 issues a certificate on the basis of an issuing request for the certificate and distributes certificate revocation information on the basis of a revoking request for the certificate. As shown in FIG. 2, the certificate authority 50 includes: a private key A501 to form the certificate; a public key certificate A502 corresponding to the private key; a certificate generating unit 502 for generating the certificate on the basis of an issuing request for the certificate; a revocation information generating unit 503 for generating the revocation information of the certificate on the basis of the revoking request for the certificate; a revocation information DB 504 for holding the revocation information generated by the revocation information generating unit; a communicating unit 501 for transmitting and receiving data; a key generating unit 505 for generating a private key and a public key corresponding to the private key; and a certificate issuing request generating unit 506 for generating a certificate issuing request to request another apparatus to issue the certificate.

Figure 3:
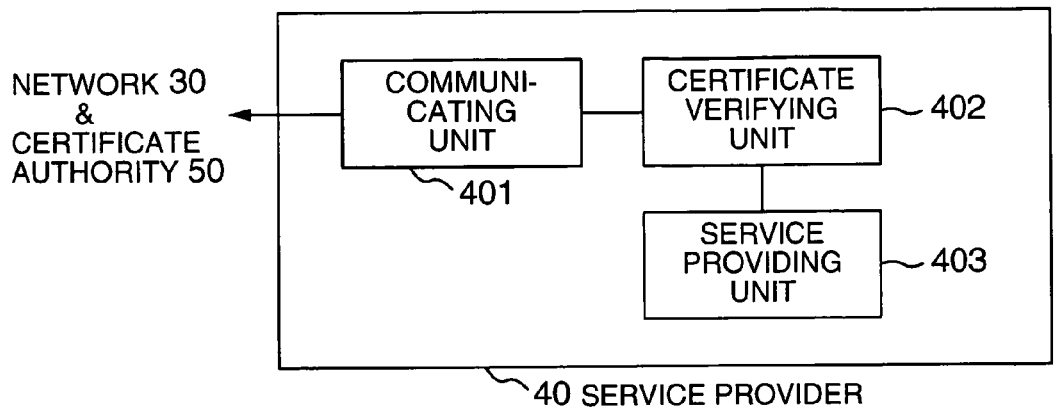
FIG. 3 is a diagram showing an example of a construction of a service provider shown in FIG. 1.

The service provider 40 verifies the validity of the presented certificate and, if the validity verification can correctly be made, provides the services. As shown in FIG. 3, the service provider 40 includes: a certificate verifying unit 402 for verifying the validity of the presented certificate; a service providing unit 403 for providing services if the validity verification can correctly be made by the certificate verifying unit; and a communicating unit 401 for transmitting and receiving data.

Figure 4:
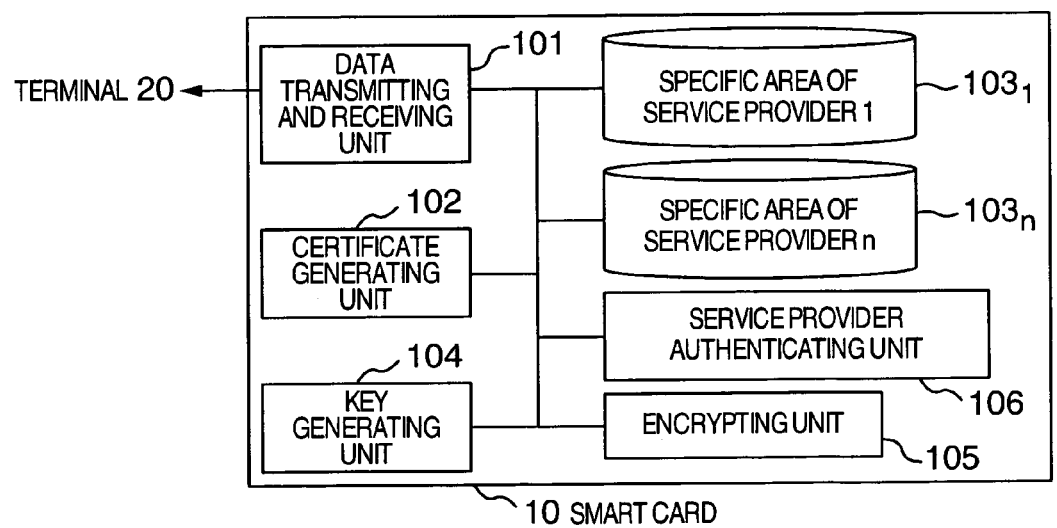
FIG. 4 is a diagram showing an example of a construction of a smart card shown in FIG. 1.

The smart card 10 has a specific area for each service provider 40. The area has an information storing function. Information of the service provider 40 is held in the area. The smart card 10 issues the certificate on the basis of an issuing request for the certificate. As shown in FIG. 4, the smart card 10 includes: service provider specific areas $103_1$ to $103_n$ (hereinafter, also simply referred to as a service provider specific area 103) which hold the information of the service providers $40_1$ to $40_n$; a certificate generating unit 102 for issuing the certificate by using the private key held in the service provider specific area 103 on the basis of the issuing request for the certificate; a data transmitting and receiving unit 101 for transmitting and receiving data to/from an outside; a key generating unit 104 for generating a pair of the private key and the public key; an encrypting unit 105 for encrypting by using the private key; and a service provider authenticating unit 106 for authenticating the service provider 40 corresponding to the service provider peculiar area 103 and permitting only the service provider 40 to access.

The terminal 20 transmits the request from the service provider 40 to the smart card 10, extracts the information from the smart card 10, and transmits it to the service provider 40. Only the corresponding service providers $40_1$ to $40_n$ can execute the information transfer to the service provider specific areas $103_1$ to $103_n$ by an access control function of the service provider authenticating unit 106, respectively.

Figure 5:
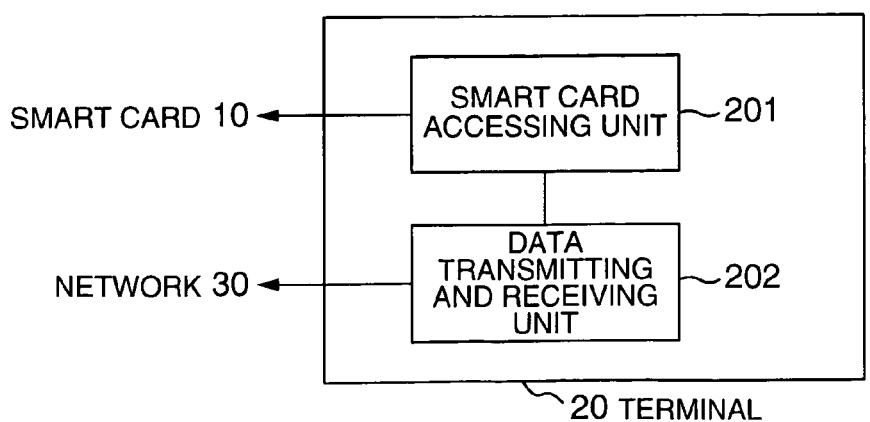
FIG. 5 is a diagram showing an example of a construction of a terminal shown in FIG. 1.

As shown in FIG. 5, the terminal 20 includes: a smart card accessing unit 201 for transmitting and receiving data to/from the smart card 10; and a data transmitting and receiving unit 202 for transmitting and receiving data to/from the service provider 40 or the certificate authority 50.

Figure 6:
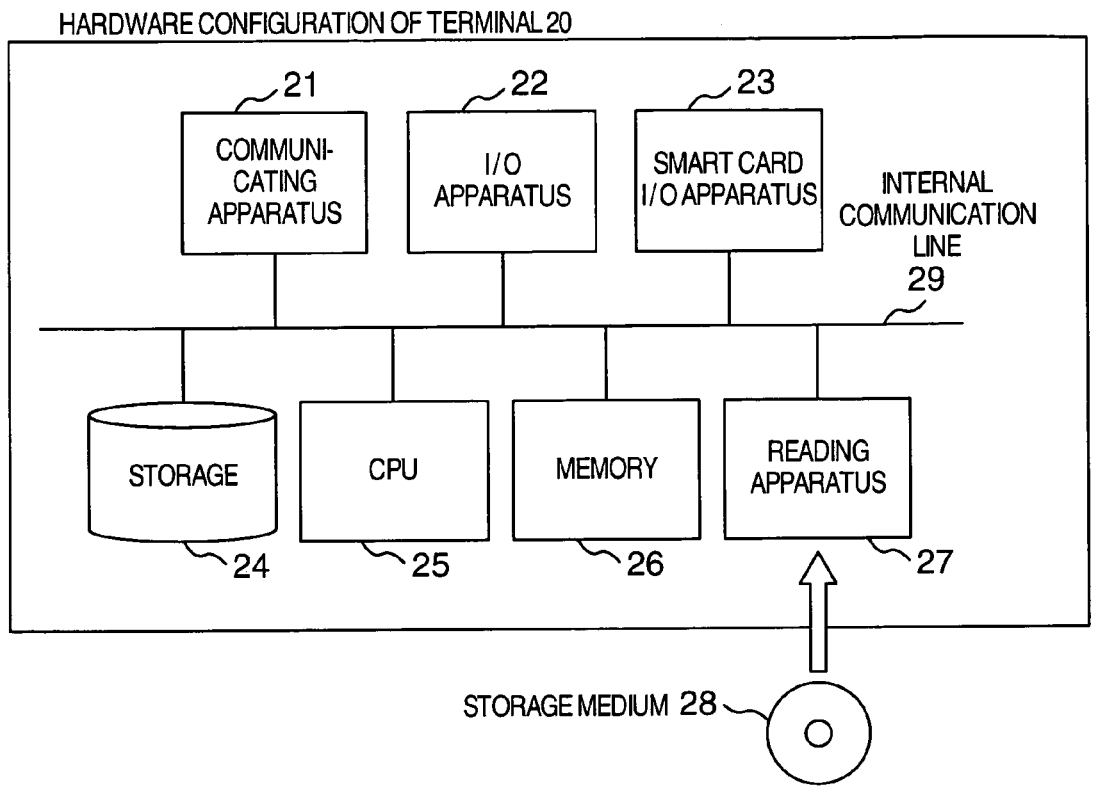
FIG. 6 is a diagram showing an example of a construction of hardware of the terminal shown in FIG. 1.

FIG. 6 is a block diagram showing a hardware configuration of the terminal 20. The terminal 20 is configured in a manner such that a communicating apparatus 21, an input/output apparatus 22, a smart card input/output apparatus 23, a storage 24 such as DVD or hard disk, a CPU 25, a high-speed work memory 26, and a reading apparatus 27 are connected by an internal communication line 29 such as a bus or the like and a storage medium 28 is included. The terminal 20 is connected to the smart card 10 via the smart card input/output apparatus 23.

A hardware configuration of each of the service provider 40 and the certificate authority 50 is similar to that of the terminal 20. If the service provider 40 and the certificate authority 50 do not directly access the smart card 10, there is no need to provide the smart card input/output apparatus 23.

Figure 7:
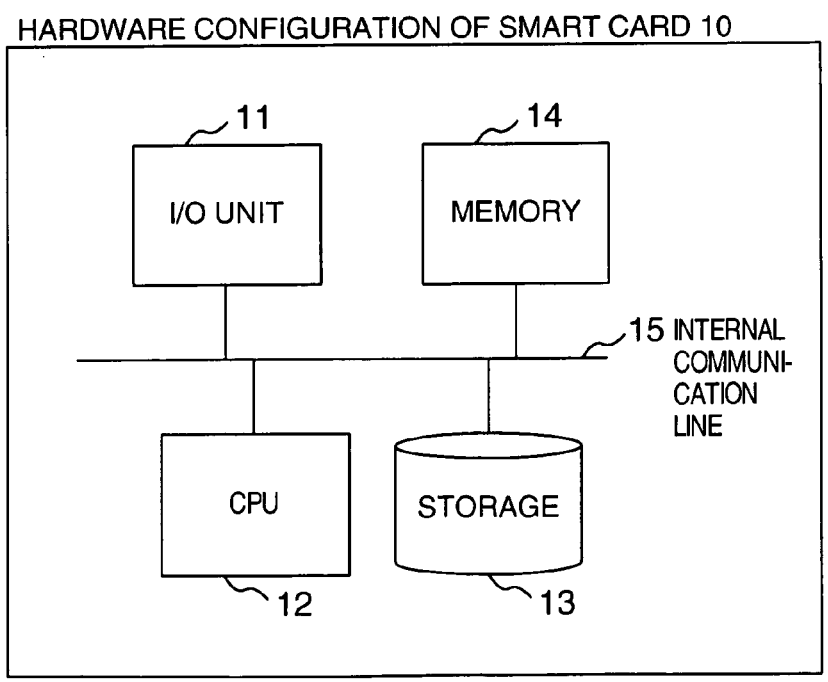
FIG. 7 is a diagram showing an example of a construction of hardware of the smart card shown in FIG. 1.

FIG. 7 is a block diagram showing a hardware configuration of the smart card 10. The smart card 10 is configured in a manner such that an input/output unit 11, a CPU 12, an tamper-resistant storage 13, and an tamper-resistant memory 14 are connected by an internal communication line 15 such as a bus or the like.

A processing flow in the certificate management system of the embodiment will be described. The processing flow, which will be explained hereinbelow, is executed by a method whereby a program stored in the storage of each apparatus is loaded into the work memory and executed by the CPU, so that the processing flow is executed by each apparatus constructing the certificate management system and by each processing unit which is implemented on the smart card. Each program can be preliminarily stored in the storage or can be also installed as necessary via another storage medium or communicating medium (a network or a carrier which propagates on the network).

Figure 8:
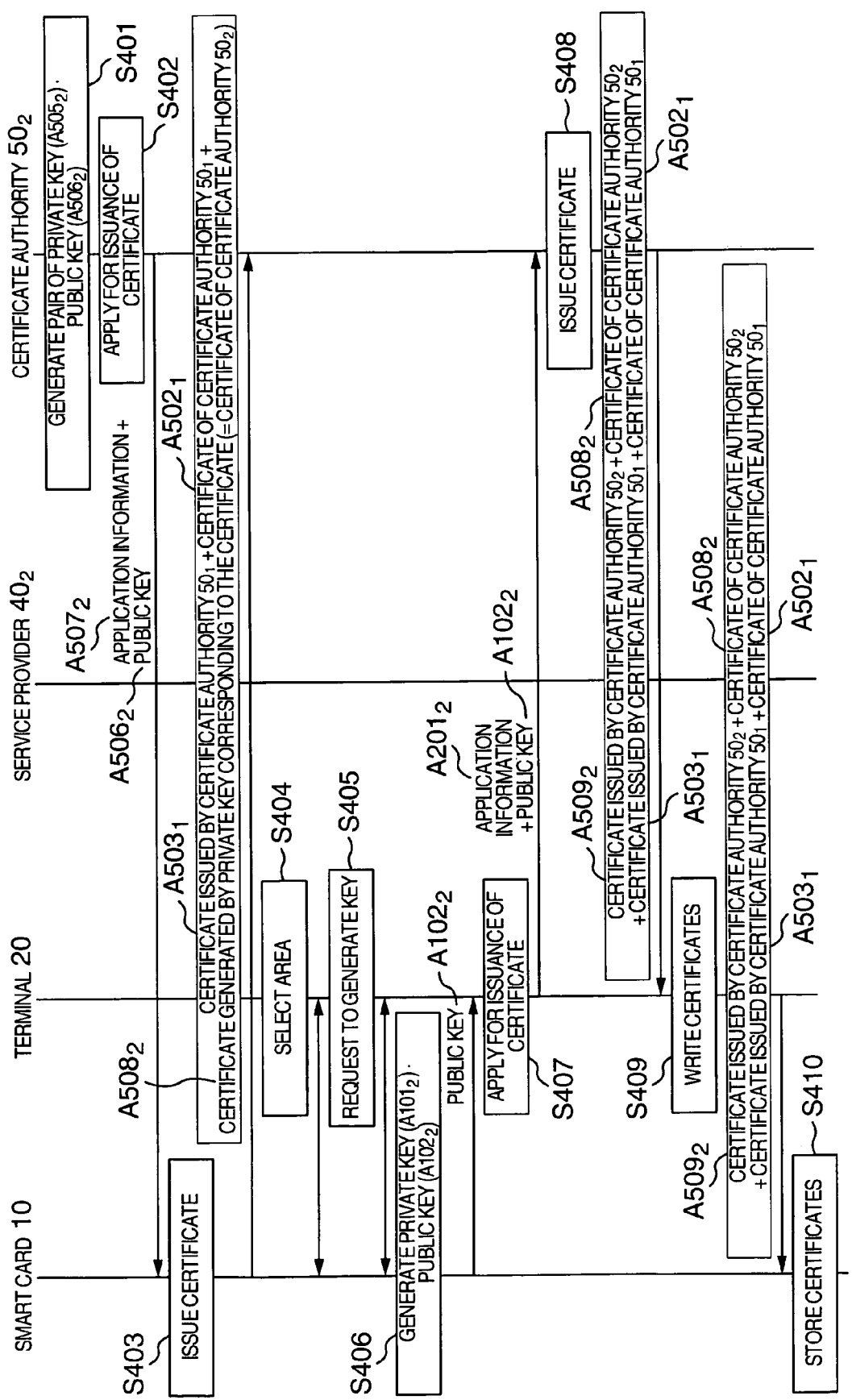
FIG. 8 is a flowchart for explaining certificate issuance of the certificate management system showing the embodiment of the invention.

FIG. 8 is a flowchart in the case where after the certificate authority $50_1$ on which the first service provider $40_1$ relies issued the certificate to the smart card 10, the certificate authority $50_2$ on which the second service provider $40_2$ relies issues the certificate to the smart card 10.

After the certificate authority $50_1$ on which the first service provider $40_1$ relies issued the certificate to the smart card 10, a pair of a private key $A101_1$ and a public key $A102_1$ generated in the smart card, a certificate $A503_1$ issued by the certificate authority $50_1$ on which the first service provider $40_1$ relies by using its own private key $A501_1$ in response to the public key $A102_1$, and its own certificate $A502_1$ corresponding to its own private key $A501_1$ of the certificate authority $50_1$ are stored in the area of the first service provider $40_1$ in the smart card.

In the certificate authority $50_2$, the key generating unit 505 generates a pair of a private key $A505_2$ and a public key $A506_2$ (step S401).

The certificate issuing request generating unit 506 generates the issuing request for the certificate for the smart card and transmits application (request) information $A507_2$ and the public key $A506_2$ to the smart card (step S402)

In the smart card 10, the certificate generating unit 102 forms a certificate $A508_2$ of the certificate authority $50_2$ by using the private key $A101_1$ (step S403).

The certificate generating unit 102 transmits the certificates $A503_1$ and $A502_1$ and the certificate $A508_2$ generated in step S403 to the certificate authority $50_2$ via the data transmitting and receiving unit 101. After that, the terminal 20 selects the area of the second service provider $40_2$ for the smart card 10 (step S404).

The terminal 20 requests the smart card 10 to generate a pair of a private key and a public key (step S405).

In the smart card 10, the key generating unit 104 generates a private key $A101_2$ and a public key $A102_2$ and stores them into the area selected in step S404 and corresponding to the provider $40_2$ (step S406)

The key generating unit 104 of the smart card 10 transmits the generated public key $A102_2$ to the terminal 20 via the data transmitting and receiving unit 101. The terminal 20 transmits the public key $A102_2$ and certificate application (request) information $A201_2$ to the certificate authority $50_2$ (step S407)

In the certificate authority $50_2$, the certificate generating unit 502 generates a certificate $A509_2$ by using the private key $A505_2$ corresponding to the certificate $A508_2$ issued from the smart card in step S403 (step S408).

In the certificate authority $50_2$, the communicating unit 501 transmits the certificate $A509_2$, the certificate $A508_2$ received from the smart card in step S403, the certificate $A503_1$, and the certificate $A502_1$ to the terminal 20. The terminal 20 receives those certificates and writes them into the smart card 10 (step S409).

The data transmitting and receiving unit 101 of the smart card 10 stores each of the received certificates into the area selected in step S404 (step S410).

Besides the public key $A506_2$, information such as smart card information, personal information, and the like can be also included in the certificate which is issued in step S403.

Although the private key $A101_2$ and the public key $A102_2$ are generated in the smart card 10 in step S406, they can be also generated in the certificate authority $50_2$ and stored in the smart card 10.

Figure 9:
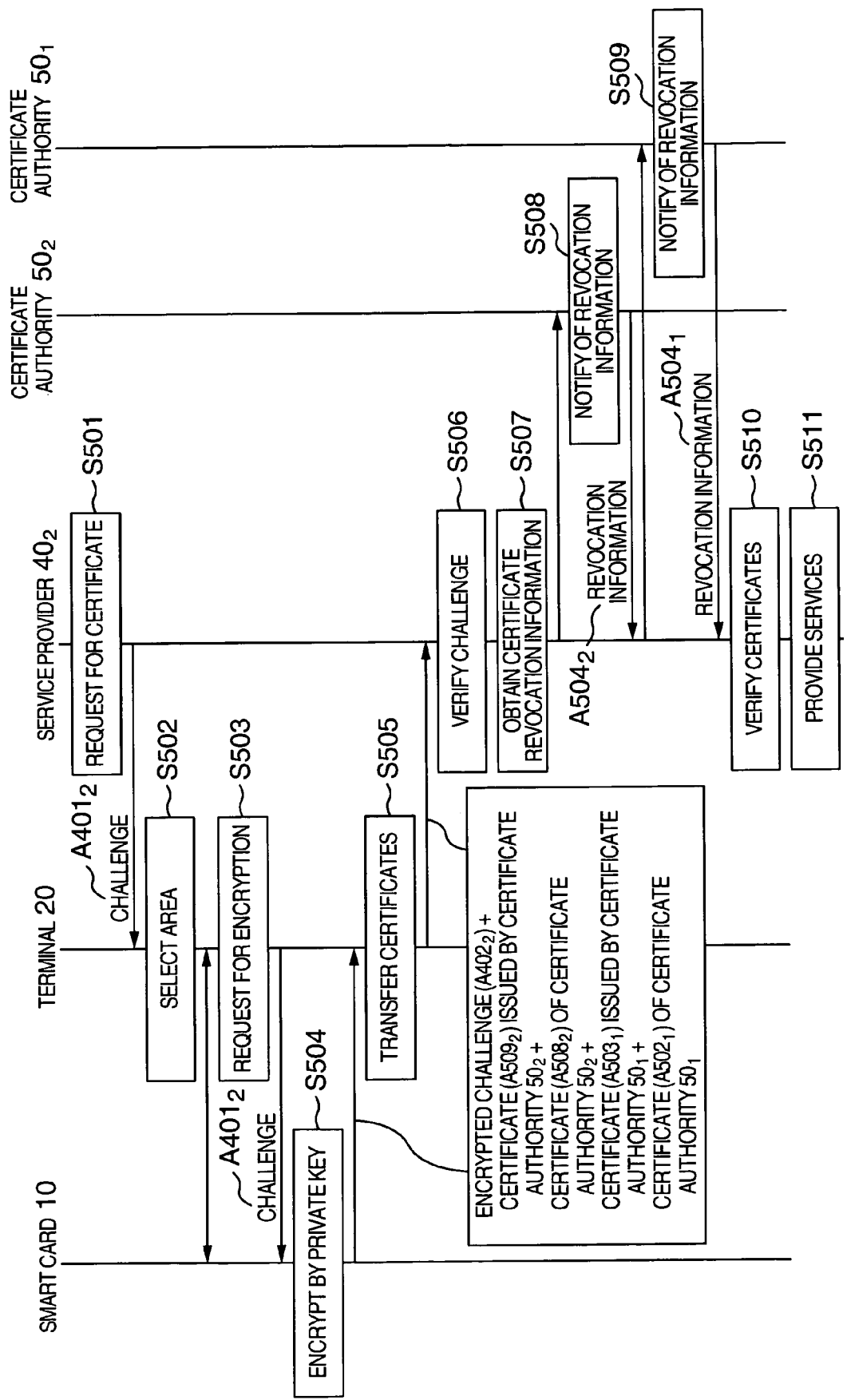
FIG. 9 is a flowchart for explaining certificate verification of the certificate management system showing the embodiment of the invention.

FIG. 9 is a flowchart for verifying the certificate $A509_2$ issued to the smart card 10 by the certificate authority $50_2$ on which the second service provider $40_2$ relies.

In the service provider $40_2$ which received the service providing request from the terminal 20, the certificate verifying unit 402 forms a challenge (for example, random numbers) $A401_2$, transmits it to the terminal 20, and requests for the certificate (step S501).

The terminal 20 selects the area of the service provider $40_2$ for the smart card 10 (step S502)

The terminal 20 sends the challenge $A401_2$ transmitted from of the service provider $40_2$ in step S501 to the smart card 10 and requests the smart card to encrypt (step S503).

In the smart card 10, the encrypting unit 105 encrypts the challenge $A401_2$ by using the private key $A101_2$ held in the area selected in step S502 (step S504).

The data transmitting and receiving unit 101 of the smart card 10 transmits a challenge $A402_2$ encrypted in step S504, the certificate $A509_2$ corresponding to the private key $A101_2$ used for the encryption in step S504, the certificate $A508_2$ of the certificate authority $50_2$ corresponding to the private key used for the issuance of the certificate $A509_2$, the certificate $A503_1$ corresponding to the private key in the smart card used for the issuance of the certificate $A508_2$, and the certificate $A502_1$ to the terminal 20.

The terminal 20 transfers the encrypted challenge $A402_2$ received from the smart card 10 and those certificates to the service provider $40_2$ (step S505).

In the service provider $40_2$, the certificate verifying unit 402 decrypts the encrypted challenge $A402_2$ by using the received certificate $A509_2$ and confirms whether the decrypted challenge coincides with the challenge $A401_2$ transmitted in step S501 or not, thereby verifying the challenge (step S506).

In the service provider $40_2$, the certificate verifying unit 402 executes an obtaining process of the revocation information of the certificates to the certificate authorities $50_1$ and $50_2$ in order to confirm whether each of the received certificates is not revoked or not (step S507).

In the certificate authorities $50_1$ and $50_2$, the revocation information is generated by the revocation information generating unit 503 on the basis of the revocation information DB 504 which is updated at all times in response to a notification from the user of the smart card 10. The revocation information of the certificate is notified in accordance with the request for the revocation information in step S507 (step S508) (step S509).

In the service provider $40_2$, the certificate verifying unit 402 executes the verifying process of the certificates (step S510).

If the verification succeeds and it is determined that the certificate is valid, the service providing unit 403 provides the services (step S511).

Although the certificate verifying unit 402 verifies the certificate by itself in step S510, it is also possible to transmit the certificate to be verified to an external certificate validation authority and inquire about the validity of the certificate.

Figure 10:
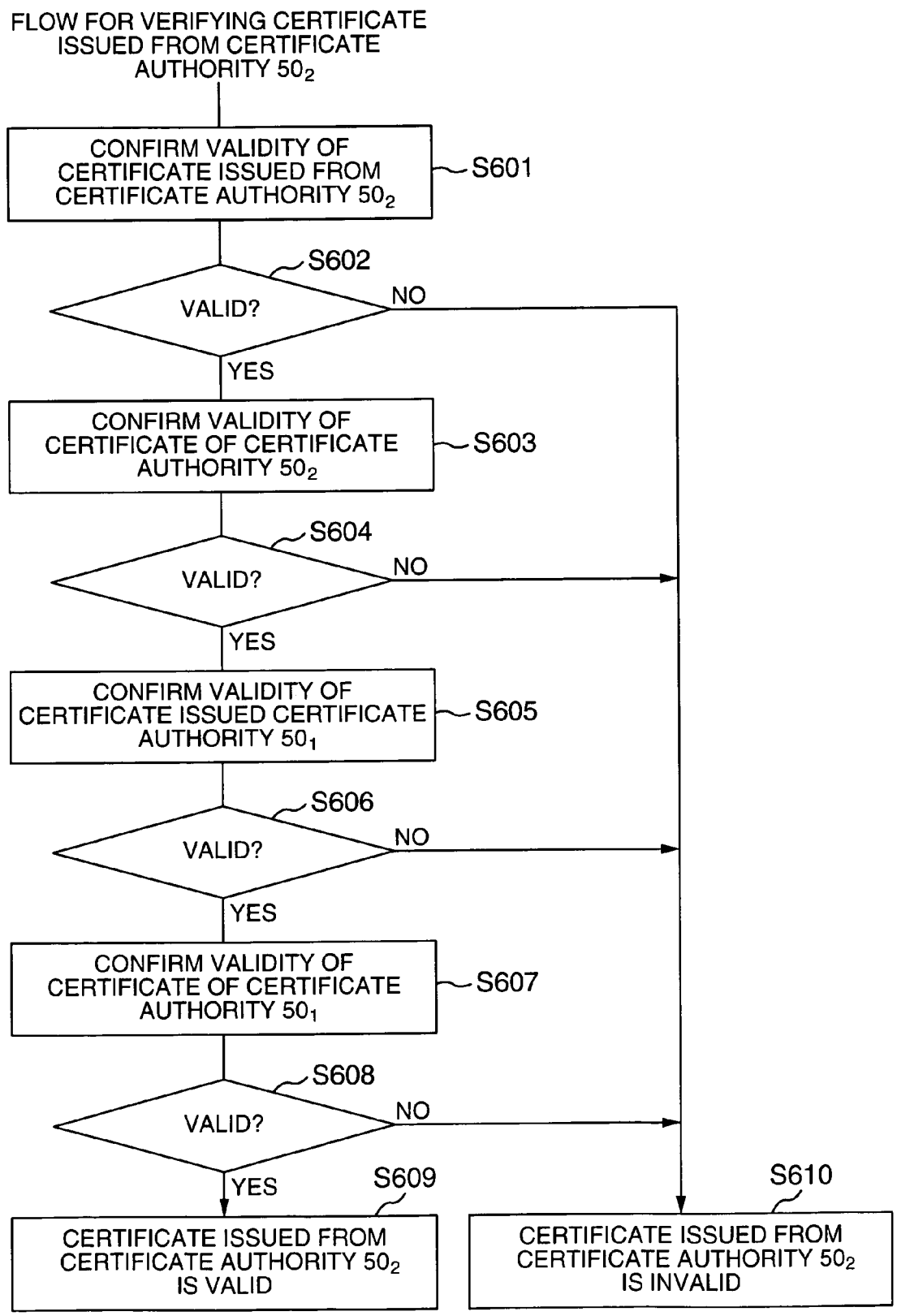
FIG. 10 is a flowchart for explaining in detail a certificate verifying step in FIG. 9.

FIG. 10 is a flowchart for explaining the certificate verifying step (S510) in detail.

The validity of the certificate $A509_2$ issued by the certificate authority $50_2$ is verified (step S601). Specifically speaking, whether a revoke disclosure exists in revocation information $A504_2$ notified in step S508 or not is confirmed. A digital signature described in the certificate $A509_2$ is verified by using the public key which is included in the certificate $A508_2$ of the certificate authority $50_2$ and corresponds to the private key used when the certificate $A509_2$ is issued. If the certificate is not revoked and the digital signature is valid, the next step is executed. If NO, it is determined that the certificate $A509_2$ is invalid.

The validity of the certificate $A508_2$ issued by the smart card 10 is verified (step S603). Specifically speaking, whether a revoke disclosure does not exist in the revocation information $A504_2$ notified in step S508 or not is confirmed. A digital signature described in the certificate $A508_2$ is verified by using the public key included in the certificate $A503_1$ issued to the smart card by the certificate authority $50_1$ corresponding to the private key used when the certificate $A508_2$ is issued. If the certificate is not revoked and the digital signature is valid, the next step is executed. If NO, it is determined that the certificate $A508_2$ is invalid and, at the same time, the certificate $A509_2$ is invalid.

The validity of the certificate $A503_1$ issued by the certificate authority $50_1$ is verified (step S605). Specifically speaking, whether a revoke disclosure does not exist in revocation information $A504_1$ notified in step S509 or not is confirmed. A digital signature described in the certificate $A503_1$ is verified by using the public key included in the certificate $A502_1$ of the certificate authority $50_1$ corresponding to the private key used when the certificate $A503_1$ is issued. If the certificate is not revoked and the digital signature is valid, the next step is executed. If NO, it is determined that the certificate $A503_1$ is invalid and, at the same time, the certificate $A508_2$ is invalid and the certificate $A509_2$ is invalid.

The validity of the certificate $A502_1$ issued by the certificate authority $50_1$ is verified (step S607) Whether a revoke disclosure does not exist in the revocation information $A504_1$ notified in step S509 or not is confirmed. Since the certificate $A502_1$ is the certificate of the certificate authority on which the service provider $40_2$ relies, if the certificate A502$_1$ is not revoked, it is determined that the certificate A502$_1$ is valid and, at the same time, the certificate A503$_1$ is valid, the certificate A508$_2$ is valid, and the certificate A509$_2$ is valid (step S609).

If NO, it is determined that the certificate A502$_1$ is invalid and, at the same time, the certificate A503$_1$ is invalid, the certificate A508$_2$ is invalid and, the certificate A509$_2$ is invalid (step S610).

Order of the validity confirming steps (S601, S603, S605, S607) mentioned above can be replaced.

As mentioned above, in the embodiment, a chain of the certificates is constructed so that the verification of the validity of the certificate A508$_2$ and the certificate A502$_1$ is necessary to verify the validity of the certificate A509$_2$. By such a chain structure, if the user wants to revoke the certificates A509$_2$ and A502$_1$ for some reason such that he lost the smart card or the like, merely by executing the process to revoke the upper certificate A502$_1$, the certificate A509$_2$ can be also revoked without executing the process to revoke the certificate A509$_2$.

The system is also constructed in a manner such that upon verification of each certificate, the revocation information A504$_1$ and A504$_2$ issued by the issuing source side certificate authority are referred to. Owing to this construction, the certificate A509$_2$ and/or the certificate A502$_1$ can be also individually revoked. For example, in the case of stopping the services which are provided by the service provider 40$_2$ or the like, it is sufficient to issue the revocation information by the certificate authority on which the service provider 40$_2$ relies. Thus, while the certificate issued by the certificate authority 50$_1$ on which the service provider 40$_2$ relies is held in a valid state, the certificate A509$_2$ issued from the certificate authority 50$_1$ on which the service provider 40$_2$ relies can be revoked.

The invention is not limited to the foregoing embodiment but many variations and modifications are possible within the scope of the spirit of the invention.

For example, although the certificate issued from the certificate authority and the certificate of the certificate authority have been stored in the smart card, for example, it is possible to provide a server apparatus such as a directory server out of the smart card as a certificate holding authority apparatus and hold the certificate. In such a case, in place of transferring and receiving the certificate in accordance with the flows shown in FIGS. 8 and 9, it is sufficient to transmit and receive information of a holding location of the certificate holding authority apparatus. The information to be transmitted and received can be also encrypted.

The data in the smart card 10 can be also encrypted and stored.

Although the certificate authority which issues the second certificate (A509$_2$) is the certificate authority 50$_2$ on which the second service provider 40$_2$ relies, the certificate authority 50$_1$ on which the first service provider 40$_1$ relies can also issue the second certificate (A509$_2$).

As an application example of the embodiment, it is also possible to construct the system in a manner such that in order to provide services from a plurality of service providers 40$_n$ (n≧2), the smart card 10 generates certificates A508$_n$ of the nth (n≧2) certificate authorities 50$_n$ as a plurality of lower certificate authorities by using the certificate A503$_1$ issued by the first certificate authority 50$_1$ as an upper certificate authority and the corresponding private key A101$_1$ and, further, the n-th certificate authorities 50$_n$ issue certificates A509$_n$ by using the certificates A508$_n$ and the corresponding private keys A505$_n$.

It is also possible to generate the certificates A508$_n$ of the nth (n>m) certificate authorities 50$_n$ by using certificates A503$_m$ issued by the m-th (m≧2) certificate authorities 50$_m$ and the private keys A101$_m$ and, further, the n-th certificate authorities 50$_n$ can also issue the certificates A509$_n$ by using the certificates A508$_n$ and the corresponding private keys A505$_n$.

What is claimed is:

1. A management system of a public key certificate comprising: a first certificate authority; a service provider which verifies validity of a presented public key certificate and, if the verification can correctly be made, provides a service; a second certificate authority on which said service provider relies; and a smart card, wherein said smart card comprises a storing unit and a certificate issuing unit, said storing unit stores;

a first private key and a first public key making a pair together therewith which are necessary to issue a certificate to said second certificate authority, a first certificate issued for said first public key from said first certificate authority, a second private key and a second public key making a pair together therewith which are generated to receive a service from said service provider, and a second certificate which is issued for said second public key by said second certificate authority on which said service provider relies, said second certificate authority comprises:

a storing unit which stores a third private key for generating the second certificate of said second public key for said smart card and a third certificate which is issued to a third public key making a pair together with said third private key; and a certificate generating unit which generates the second certificate for said second public key on the basis of an issuing request, and said certificate issuing unit of said smart card comprises a third certificate generating unit which issues the third certificate for said third public key stored in said second certificate authority by using said stored first private key on the basis of an issuing request for the certificate from said second certificate authority.

2. A system according to claim 1, wherein at least one of said first certificate authority and said second certificate authority further comprises:

a revocation information generating unit for generating revocation information of the respective certificate on the basis of a revoking request for the respective certificate; and a revocation information database for storing the revocation information generated by said revocation information generating unit, said smart card presents said first and second certificates to said service provider in order to receive the service from said service provider, and said service provider comprises a certificate verifying unit for inquiring of the respective certificate authority about the revocation information of said first and second certificates when the validity of said presented first and second certificates is verified.

3. A system according to claim 2, wherein
when said second certificate authority verifies said second certificate, said service provider transmits a challenge to said smart card, said smart card encrypts said challenge by said second private key and transmits said encrypted challenge, the second certificate corresponding to said second private key, and the first certificate corresponding to said first private key to said service provider, said service provider further comprises:

a certificate verifying unit for decrypting said encrypted challenge, confirming whether the decrypted challenge coincides with said challenge transmitted to said smart card, obtaining the revocation information of said received first and second certificates, and executing the verifying process of said first and second certificates by using said obtained revocation information; and a service providing unit for providing the services in response to a decision indicating that said first and second certificates are valid in said verifying process.

4. A system according to claim 3, wherein
said smart card constructs said storing unit as an area specific to said service provider and,
when said service provider transmits and receives data to/from said service provider specific area,
said service provider executes a mutual authenticating process between said service provider and said service provider specific area.

5. A system according to claim 3, wherein
when data is stored into said service provider specific area of said smart card and into said certificate generating unit, said data is encrypted and thereafter stored.

6. A system according to claim 2, wherein said certificate verifying unit of said service provider decides that when said first certificate is revoked, said second certificate is also revoked.

7. A system according to claim 1, wherein
said smart card constructs said storing unit comprising a service provider specific area and
includes a service provider authenticating unit for permitting only said service provider corresponding to said specific area to access said specific area.

8. A system according to claim 7, wherein
a specific area of said service provider specific area and data stored in said certificate generating unit in said smart card have been encrypted.

9. A system according to claim 1, further comprising
a certificate validation authority, and
said certificate validation authority making validity verification of at least one of said first certificate and said second certificate, by a certificate verifying unit of said service provider as an alternative of said service provier.

10. A system according to claim 1, further comprising
a certificate storage authority, and
said certificate storage authority holding a plurality of certificates stored in said smart card as an alternative of said smart card and providing said certificates in accordance with a request.

\* \* \* \* \*